UNITED STATES PATENT OFFICE.

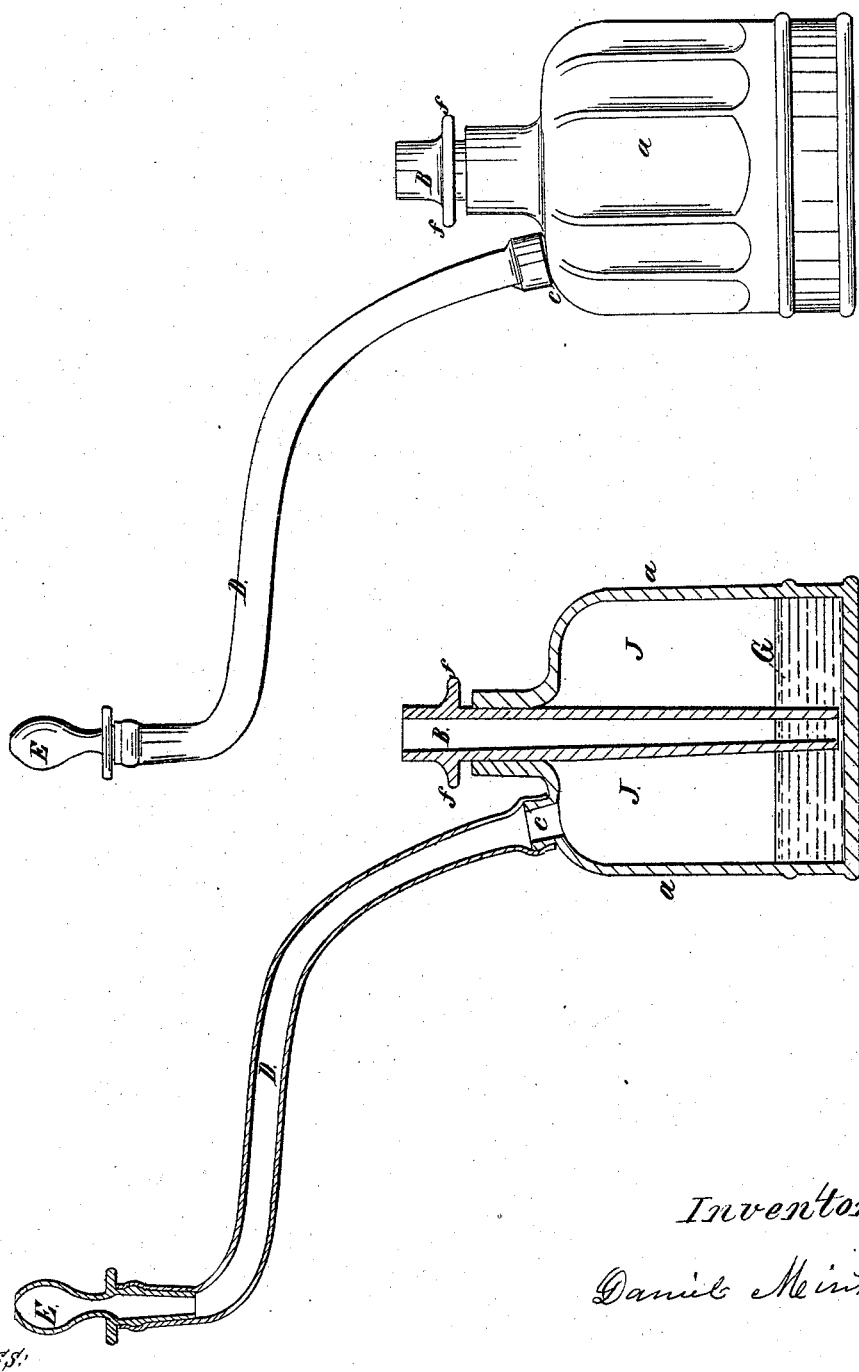

DANIEL MINTHORN, OF NEW YORK, N. Y.

INHALING-TUBE.

Specification of Letters Patent No. 11,171, dated June 27, 1854.

*To all whom it may concern:*

Be it known that I, DANIEL MINTHORN, of the city, county, and State of New York, have invented a new and Improved Inhaling Tube and Flask for Inhaling Purified or Medicated Air; and I do hereby declare that the following is a full and exact description thereof, reference being had to the accompanying drawings and to letters of reference marked thereon.

To enable others to make or use my invention I will herewith describe its construction and operation.

The flask or bottle is made of glass, as shown in the accompanying drawing (*a a*), with a tubulated glass stopper (B), both ground and fitted perfectly tight at the neck of the flask or bottle, said tubulated stopper having an encircling glass flange (*f*) which serves as a housing or covering for the neck of the flask or bottle. The object of this stopper tube is to conduct the air into the lower part of the fluid, that when the air chamber (J) is exhausted at the mouth piece (*e*) the atmospheric air will pass through the fluid (G) and replenish the chamber (J) with purified or medicated air. The nipple (C) is molded with a swell and taper tapering in order to have the india rubber tube (D) readily slide on, and smaller below the swell to have the foot of the tube (D) contract and continue there by its own tension. The mouth piece (*e*) is formed of glass with a small flange below its adaptation to the mouth and a small swell in the tube that the tension of the india rubber tube (D) will hold it firm.

The advantages of this over any other inhaling tube is first its compactness and portability, small enough to be carried in the pocket and yet containing an air chamber of sufficient capacity for the largest class of lungs; secondly, the small quantity of liquid or medicine to be used at one time; thirdly, its preference as an expander of the lungs by placing the finger as an exhaling valve on the top of the stopper tube (B), thus regulating the blowing process with greater certainty and effect than any other tube in use. Again, the fact that the air passes through liquid it is not possible for any dust to get into the lungs through liquid or fluid. And, lastly, the benefit of inhaling chloroform and ether without affecting the nasal membranes, as now done when administered by sponge or napkin (thereby not fumigating the room where said remedies are administered), I consider novel and useful.

I do not claim inhaling tubes as new, for they have been long known and used; but—

What I do claim and desire to secure by Letters Patent is—

1. The bottle or flask with an air tight stopper and a tube with its lower end submerged into said fluid.

2. And lastly, I claim the inhaling tube in combination with the flask and tube for the above named purposes.

DANIEL MINTHORN.

Witnesses:
SAML. GRUBB,
E. G. HANDY.